United States Patent [19]

Black

[11] 4,193,205

[45] Mar. 18, 1980

[54] COLUMNAR CONTAMINANT REMOVER

[76] Inventor: Frank M. Black, P.O. Box 9254, Houston, Tex. 77011

[21] Appl. No.: 937,063

[22] Filed: Aug. 28, 1978

[51] Int. Cl.² .............................................. F26B 3/00
[52] U.S. Cl. .............................................. 34/9; 34/79; 55/191
[58] Field of Search ..................... 34/9, 77, 79; 55/191

[56] References Cited

U.S. PATENT DOCUMENTS

| | | | |
|---|---|---|---|
| 2,559,129 | 7/1951 | Miller ............................ | 55/191 X |
| 3,201,919 | 8/1965 | Long ............................. | 55/191 |
| 3,977,090 | 8/1976 | Sowards ........................ | 34/9 |
| 4,060,912 | 12/1977 | Black ............................. | 34/9 |

Primary Examiner—John J. Camby
Attorney, Agent, or Firm—Robert W. B. Dickerson

[57] ABSTRACT

A device for removing contaminants from gas or other fluids. Such device includes, in a column, a tortuous pathforming member, such member including a plurality of path dispersal elements, all for assuring intimate contact between such gas or other fluids and a contaminant absorber.

2 Claims, 6 Drawing Figures

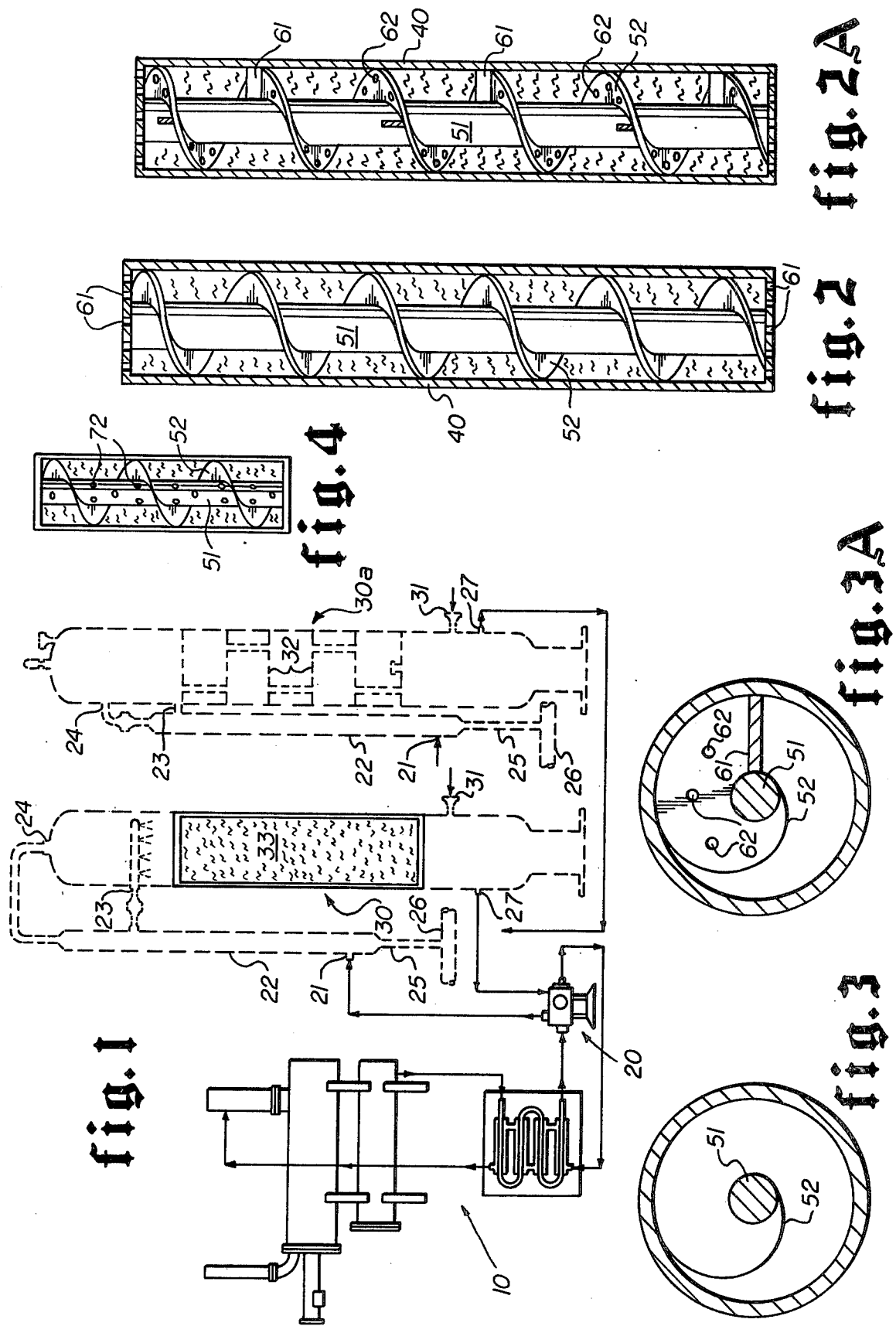

COLUMNAR CONTAMINANT REMOVER

BACKGROUND OF THE INVENTION

During the past few years, it has become essential to make more effective use of energy sources, such as gas. A major problem involves removing contaminants, including water or water vapor. One commonly used technique involves the upwardly passing of gas through a tower, such tower having a counter moving drying agent, such as glycol. A particular problem encountered by the prior art has been the tendency of such counter moving fluids to channelize, thereby preventing intimate contact between the gas and the absorbent. One method of assuring the required contact is described in applicant's U.S. Pat. No. 4,060,912. The present invention is directed to the columnar approach, and assures such contact. A search has not been performed, but attention is directed to those references listed in the mentioned patent.

SUMMARY OF THE INVENTION

In a vertical column, having an upper inlet for an absorbent and a lower inlet for gas, a tortuous path forming member is positioned between such inlets. Such path forming member may have a number of path dispersing elements therein, to mitigate channeling.

DESCRIPTION OF THE DRAWINGS

FIG. 1 is a generally schematic illustration of regeneration units, the left hand vertical column representing a packed column, and the right hand one representing a bubble tray;

FIG. 2 is a vertical section through a column, as modified by this invention;

FIG. 2a illustrates a modified column;

FIG. 3 is a section taken through the column of FIG. 2;

FIG. 3a is a section through the modified column of FIG. 2a; and

FIG. 4 is a portion of a further modified column.

DESCRIPTIONS OF PREFERRED EMBODIMENTS

FIG. 1 depicts in a generalized manner the present state of the art for removing contaminants from a gaseous media. Number 10 represents a typical regenerating unit recycling an absorbent, such as glycol, to and from pump 20. The pump forces such material, usually a liquid into the annulus of either of conduits 22, as at 21, from where it may enter, as at 23, packed column 30 or bubble tray 30a. Such packed columns or bubble trays represent alternative treatments available, and would not normally be side by side. Gas to be cleansed will enter either of members 30 or 30a, as at 31, and pass upwardly either through trays 32 or packing 33, exit at 24, pass downwardly through the central core of either conduit 22, to finally exit through outlet 25 to an output line 26. The absorbent fluid, after passing downwardly through trays 32 or packing 33, will exit at 27 to be recycled by pump 20.

Moving now to the inventive aspects of this invention. FIGS. 2 and 2a depict a vessel 40, which perform the function of the portion of packed column 30 shown in FIG. 1. Centrally positioned within such vessel a spiral or auger member is shown having a central shaft 51 having spiralar fins 52 wrapped therearound. Positioned within the reaches between adjacent fin portions might be numerous particles 33 of a fluid dispersing media, such as shown in FIG. 1. A particular useful media would be a product of partially arcuate configuration commonly known as burl saddles, of a type presently marketed under the mark INTALOK. The operation of this invention would be substantially similar to the operation of the prior art devices depicted, except that this device overcomes the earlier problems.

As previously mentioned, the prime problem is to assure contact between the rising gas and the descending cleaning or absorbent fluid. Liquids moving downwardly have a tendency to channelize, i.e., form discreet paths, leaving much of the internal volume void of such material. This, of course, means that much of the ascending gas is not cleaned. In the instant arrangement both the ascending gas and descending fluid, both of which may pass through apertures 61 prior to communicating, are purposefully caused to follow a spiralar path. All of each substance is caused to pass through continuous paths, one intersecting the other. The dispersing media as exemplified by the burl saddles, further assure intimate contact between the substances. The net result is that the gas exiting at or near the top of vessel 40 is a much cleaner gas than has previously been possible.

In the modifications of FIGS. 2a and 3a, the spiralar fins are provided with spaced wiers, or barriers 61, and adjacent thereto with apertures 62, through which the contaminant remover, such as glycol, may pass to even more assure the absence of channeling, and thereby insuring more intimate contact.

A further means for insuring such intimate contact is shown in FIG. 4, wherein vertical shaft 51 is hollow, and is provided with numerous holes or fluid passageways 72. In this embodiment, the glycol would be provided under pressure into shaft 51, and such pressure causing the glycol to exit the shaft all along its vertical length through openings 72.

Although limited embodiments have been depicted, it should be obvious that numerous modifications would be possible by one skilled in the art without departing from the spirit of the invention, the scope of which is limited only by the following claims.

I claim:

1. In a device for removing liquid contaminants from a gaseous media, the combination of:
   a vertically oriented vessel;
   liquid inlet means near the top of said vessel for permitting entry into said vessel of a contaminant removing absorbent liquid;
   liquid outlet means in said vessel substantially opposite from said liquid inlet means;
   gas inlet means in said vessel adapted to permit entry of said gaseous media near the bottom of said vessel;
   gas outlet means, for said gaseous media, near the top of said vessel;
   spiral means positioned within said vessel, substantially intermediate said gas inlet and gas outlet means for causing said gaseous media to follow a tortuous path in traversing from said gas inlet means to said gas outlet means and
   path dispersing means comprising a plurality of discreet elements substantially filling said vessel.

2. A method of removing contaminants from a gas comprising:
   causing said gas to move upwardly within a vessel from near its bottom along a tortuous and spiralar path to exit near said vessel's top, and
   causing a cleaning liquid to move downwardly from near said vessel's top counter currently to the upward path of said gas to exit near said vessel's bottom.

* * * * *